…

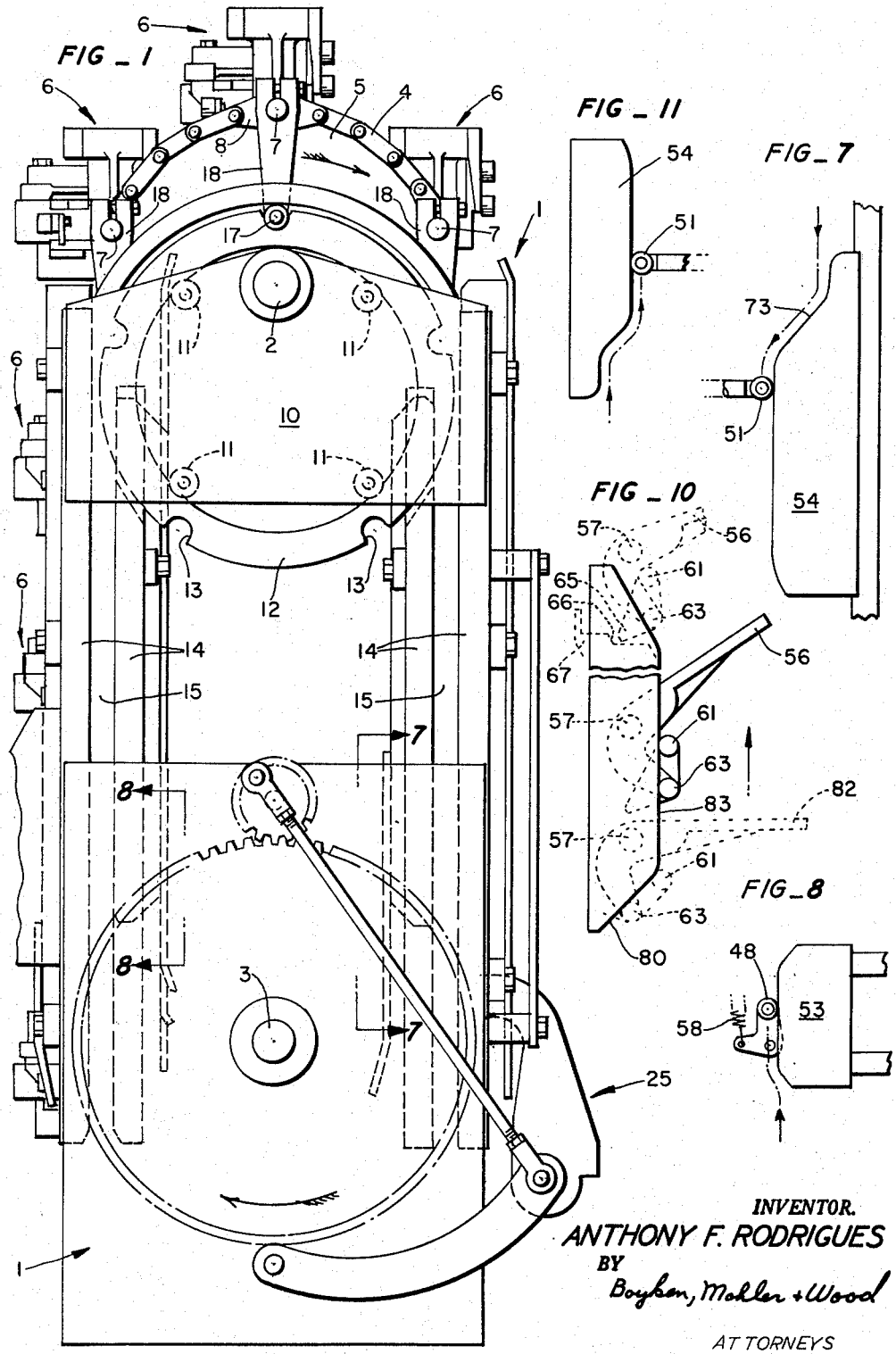

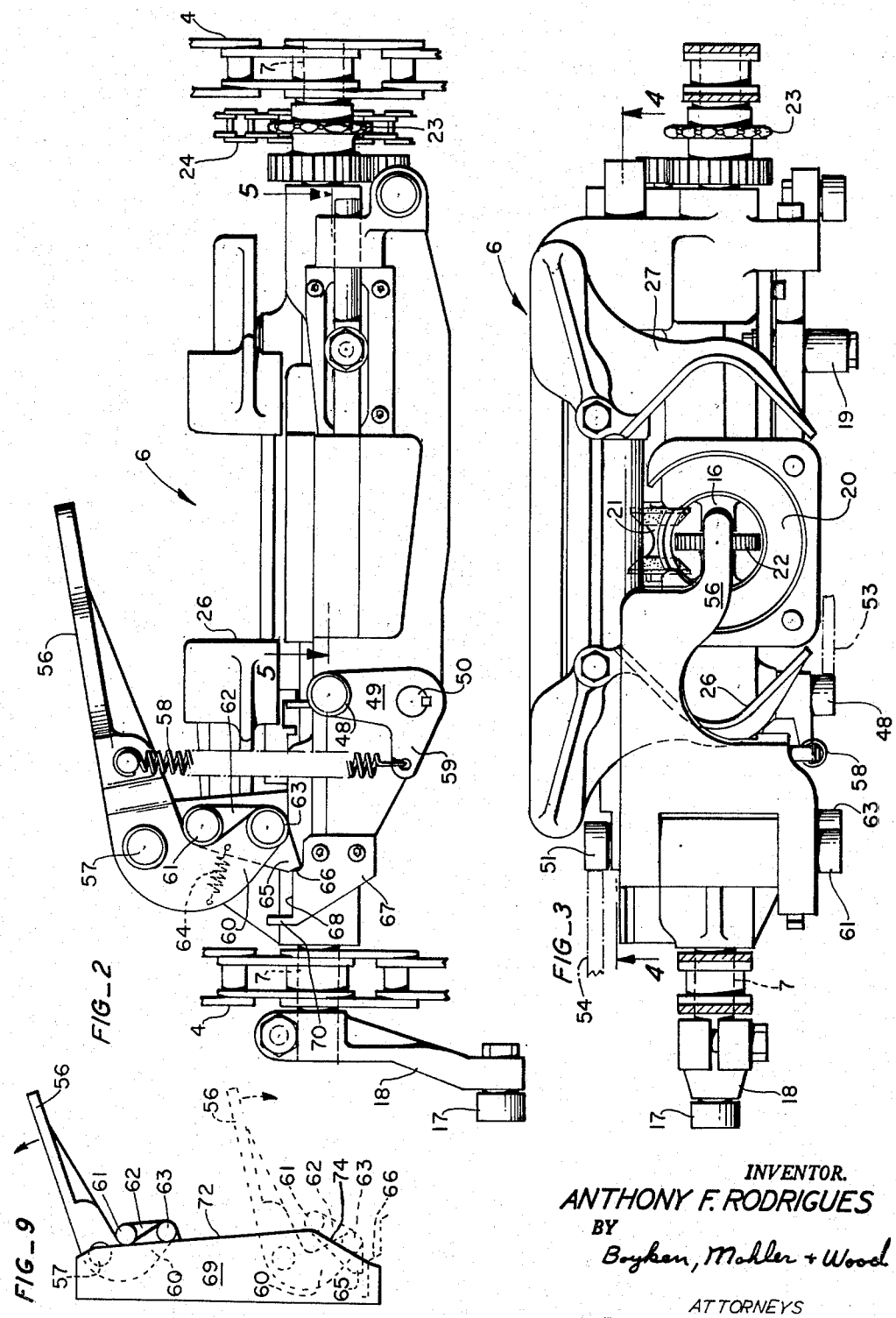

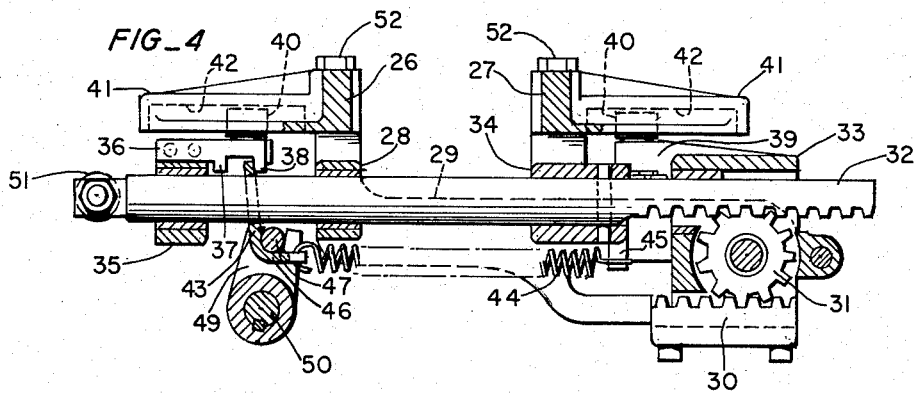
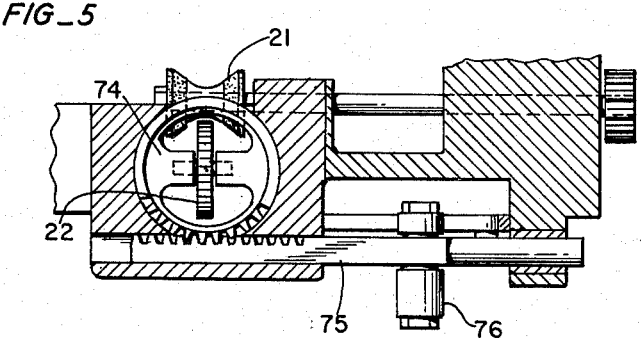
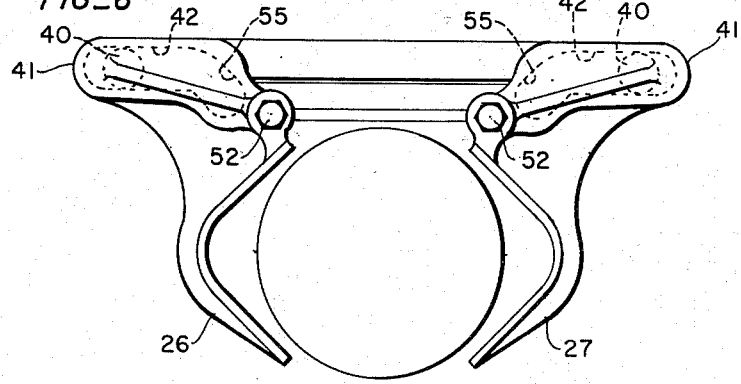

United States Patent Office 3,179,232
Patented Apr. 20, 1965

3,179,232
FRUIT ORIENTOR AND METHOD
Anthony F. Rodrigues, Los Gatos, Calif., assignor, by mesne assignments, to Filper Corporation, San Ramon, Calif.
Filed Sept. 7, 1961, Ser. No. 136,489
6 Claims. (Cl. 198—33)

This invention relates to a fruit aligner and has for one of its objects the provision of a machine for aligning fruit, such as peaches, relative to their stem ends, or relative to an indent in one of the sides of each fruit body, and which machine provides for more movement of the fruit in a shorter horizontal distance than heretofore.

Another object of the invention is the provision, in a fruit orienting machine, of means for more quickly centering the fruit in a position for most efficient orientation thereof while moving the fruit along a path of travel.

A still further object of the invention is the provision of a fruit orienting machine having means for holding the fruit units against movement out of an oriented position after orientation thereof and during the step of transferring the fruit units to a pitter or to another point for processing of the fruit.

Other objects and advantages will appear in the description and drawings.

In the drawings

FIG. 1 is a side elevational view of the machine.

FIG. 2 is an enlarged side elevational view of one of the orienting mechanisms.

FIG. 3 is a top plan view of the orienting mechanism shown in FIG. 2.

FIG. 4 is a vertical sectional view taken along line 4—4 of FIG. 3.

FIG. 5 is a horizontal sectional view taken along the line 5—5 of FIG. 2.

FIG. 6 is a top plan view of a pair of fruit clamps in a position for supporting the peach or fruit body during the orienting step, and following the step of substantially aligning the peach over the orienting wheel. The peach is indicated between the clamps.

FIG. 7 is a fragmentary view taken substantially along line 7—7 of FIG. 1.

FIG. 8 is a fragmentary view taken substantially along line 8—8 of FIG. 1.

FIG. 9 is a fragmentary view taken along a line approximately at the same place as line 7—7 at the discharge or transfer side of the machine showing the action of one set of cam followers on the orienting mechanism.

FIG. 10 is a fragmentary view taken substantially at the same place as is indicated by line 8—8 of FIG. 1 but showing a cam for repositioning the top clamp.

FIG. 11 is a fragmentary view similar to that of FIG. 7 but at the side of the machine opposite to the cam of FIG. 7.

Referring to FIG. 1, the aligner comprises a stationary vertically extending frame generally designated 1 having an upper horizontal shaft 2 and a lower horizontal shaft 3 journalled therein for rotation about parallel axes. A pair of endless chains 4 (FIGS. 1, 2) extend over corresponding sprocket wheels 5 (FIG. 1) that are secured on each of said shafts, and either of said shafts may be connected with any suitable source of power for rotation thereof and for moving the chains in the direction of the arrow as seen in FIG. 1 so that the upper sprocket wheels, as seen in FIG. 1, will move clockwise.

Between the chains 4 are a series of aligning mechanisms as shown in FIGS. 2, 3. The rear ends of several of these mechanisms are also seen at the upper end of FIG. 1, and each is generally designated 6. Each aligning mechanism includes a main horizontal shaft 7 (FIG. 2) that is journalled for rotation at its end in opposed links 8 of chains 4 (FIG. 1).

Rotatably supported on an upper plate 10 that is part of frame 1 at the upper end of the latter are a plurality of rollers 11 that support a ring 12 for rotation of said ring about its central axis, and said ring 12 is formed in its outer peripheral edge with a plurality of equally spaced radially outwardly opening recesses 13.

Rigidly secured on frame 1 are two pairs of vertical, horizontally spaced strips 14 providing a vertical space 15 between the strips of each pair. The upper and lower ends of the spaces 15 are open and are positioned to receive a horizontally disposed roller 17 (FIG. 1) that is on the lower end of an arm 18 that has its upper end secured on shaft 7 of each aligning mechanism 6.

The roller 17 will be retained in space 15 between the guide strips 14 during the vertical movement of the chains 4 upwardly and downwardly, and at the opposite upper and lower ends of the chains, the roller 17 on each orienting mechanism will enter each recess 13 as each of the latter scans the spaces 15 and each arm 18 will be held vertical as the rings 12 rotate about their axes. The connection between the rollers 17 and the rings 12 and the fact that arms 18 are connected with the chains 4 that are power driven will result in each orienting mechanism being power driven across the spaces between the opposite open ends of the sets of guide strips 14 and rings 12 will maintain the orienting mechanisms in the same position during said movement between said open ends as when the orienting mechanisms are moving vertically and when rollers 17 are in spaces 15.

Each orienting mechanism 6 includes an upwardly opening cup 20 (FIG. 3) so as to support a fruit body, such as a peach, therein, and a conventional power driven orienting spool 21 drives an oscillatorily supported orienting wheel 22 that projects upwardly into an opening in the bottom of each cup to partially support and to rotate a peach in the cup about different axes until its stem indent receives the upper part of the wheel, after which the cup will solely support the peach and it will remain stationary in its oriented position. Wheel mount 74 (FIG. 5) is supported for oscillatory movement and is operatively connected by a rack 75 with a cam follower 76 that, in turn, is adapted to engage a generally sinuously vertically extending stationary cam surface on a cam (not shown) on frame 1 to move the wheel about a vertical axis for alternate engagement of the wheel with one side or the other of the heads of spool 21. The wheel mount 74 is formed with teeth in engagement with the teeth of rack 75.

The foregoing is substantially conventional, no claim being made thereto, and it is to be understood that wheel 16 need not be oscillated about a vertical axis but may be rotated about a stationary horizontal axis.

In the present disclosure the driving spool 21 is on a shaft having a sprocket wheel 23 (FIG. 2) on one end, the teeth of which wheel 23 engages a stationary chain 24 to effect rotation of the spool 21 as the orienting mechanisms are moved along their path.

The provision of means whereby each fruit unit is carried in a support through an ascending and a descending flight without transferring each unit to another support, provides a longer path for orientation than heretofore, yet contained within the same space.

Included in each orienting unit is a pair of horizontally opposed, spaced, fruit clamps 26, 27 (FIGS. 3, 6), each clamp having a generally V-shaped clamping face so that a peach (FIG. 6) will be centrally aligned between them on cup 20 (FIG. 3) upon moving the clamps into engagement with opposite sides of a peach.

FIG. 4 is a vertical cross sectional view showing clamp 26 provided with a depending projection 28 formed with a lateral extension 29 that is connected with a lower rack 30, which rack, in turn, has its upwardly directed teeth in mesh with the teeth on a gear 31. Thus gear 31 also has its teeth in mesh with the teeth formed in the lower side of one end of a rod 32. The gear 31 itself is supported for rotation on a fixed portion 33 on the body of the orienting mechanism. The downward projection 28 on clamp 26 is slidable on the rod 32, while a somewhat similar downward projection 34 on clamp 27 is pinned to the rod. Also, the toothed end of rod 32 that is in mesh with gear 31 is supported in the fixed support 33 for slidaable movement through the latter.

By the above structure it is seen that upon moving the rod 32 to the right, as seen in FIG. 4, the clamp 27 will be moved to the right, and clamp 26 will be driven by the connection between gear 31 and rack 30 the same distance to the left.

A stationary bearing 35 on the body of the orienting mechanism (FIG. 4) carries a latch lock in the form of a stationary piece 36 having horizontally spaced downward projections 37, 38 rigid therewith above bar 32 adjacent to the downward projection 28. This piece 36 and also a part 39 on the stationary portion 33 that is adjacent to clamp 27 have cam followers 40 supported thereon which cam followers are received in downwardly opening cam tracks 42 formed in a portion 41 on each of the clamps 26, 27 (FIGS. 4, 6).

As seen in dotted lines in FIG. 6, cam tracks 42 are convergently angled at their innermost ends, as at 55, in the direction of a pair of pivots 52 upon which clamps 26, 27 are rotatably mounted. As clamps 26, 27 are moved apart, by the action of a cam follower 51 (FIG. 4) engaging surface 73 of track 54 (FIG. 7) that is rigid on frame 1, and approach their extreme spread position, the inwardly angled surfaces 55 of tracks 42 engages stationary rollers 40 and upon continued outward movement, the clamps 26, 27 are forced to rotate about pivots 52 to further effect a spreading of said clamping members apart with respect to each other. FIG. 3 shows the clamps when so spread.

Below the piece 36, or stationary lock member, is a locking member 43. This member is merely a flat strip 43 formed with an aperture through which rod 32 extends. The aperture is a loose fit so that strip 43, when held in a canted position, will lock rod 32 against movement of the rod in a direction for moving the rod 32 to the left, as seen in FIG. 4, or for moving the clamps 26, 27 together. However, the rod 32 can always be moved to the right, as seen in FIG. 4, for separating the clamps.

The lower portion of strip 43 is connected by a spring 44 with a projection 45 on the lower part of the downward projection 34 of clamp 27. This spring functions to hold the locking strip canted to automatically lock the rod 32 in any position to which it may be moved, until the lower portion of the strip 43 is moved to straighten the strip, and the upper portion of said strip is engaged by the projection 37 on piece 36, said upper part of said strip being between projections 37, 38.

Strip 43 has a lateral extension 46 that is directed generally toward the stationary portion 33 that is adjacent to clamp 27, and a pin 47 (FIG. 4) on a cam follower 48 (FIG. 2) extends across the reentrant angle formed by strip 43 and lateral projection 46 on said strip, which pin is held between the forked outer ends of a pair of opposed arms 49 that, in turn, are on a hub secured on a pivot shaft 50.

The end of the rod 32 that is opposite to its toothed end carries a cam follower 51 (FIGS. 3, 4).

From the foregoing description it will be seen that when the cam follower 51 is moved to the right, as seen in FIG. 4, the clamps 26, 27 will be moved apart on a straight line, as distinguished from a pivotal movement, and this movement will be against the resistance of spring 44, which spring will also function to hold the locking latch strip 43 canted to immediately lock the clamps 26, 27 when the movement of rod 32 to the right is discontinued.

As soon as the cam follower 48 is swung counterclockwise, as seen in FIG. 2, the latch 43 will be straightened to release the clamps 26, 27 for movement toward each other and into engagement with the opposite sides of a peach.

When the orienting mechanism reaches the peach receiving station at the lower left hand side of the machine, as seen in FIG. 1, the clamps 26, 27 will be in a wide open position substantially as seen in FIG. 3 to receive a peach in the cup 20. However, as soon as a peach is in said cup, the cam 53 (FIG. 8) that is stationary on frame 1 of the machine will engage the cam follower 48 to swing pin 47 (FIG. 4) counterclockwise to release the clamps 26, 27, and they will then immediately close on the peach to center the latter in the cup over the orienting wheel 22, and immediately thereafter, the cam follower 48 will move off the cam 53 and a cam track 54 (FIG. 11), also rigid on frame 1, will engage the cam follower 51 to push the rod 32 to the right, as seen in FIG. 4, so that clamps 26, 27 will be moved to the position seen in FIG. 6, in which the clamps will be relatively close to the peach but will not be in clamping relation thereto. In this position the peach will be substantially centered over the wheel, and the clamps will remain in this position until the orienting mechanism approaches the transfer device 25 at the lower right hand side of the machine.

When the orienting mechanism reaches, or almost reaches the transfer mechanism, the clamps must move apart a sufficient distance to enable the jaws of the transfer device 25, similar to sheet shown in McClelland Patent 2,969,867 of January 31, 1961, to pass between the clamps 26, 27 to opposite sides of the peach in order to grip the peach between them.

Since the orienting of the peach has been accomplished by the time the peach reaches the transfer device and is substantially centered over the wheel, provision is made to hold the peach against rolling to one side or the other of the cup when the clamps 26, 27 are moved apart for the admission of the transfer device.

Before describing in detail the means for holding the fruit after it has been oriented, and when the clamps 26, 27 move apart, it should be noted that the means for centering the fruit over the orienting means (wheel 22) and within the cup 20 and then freeing the fruit sufficiently to permit it to be rotated by the wheel, while supporting it over the wheel, are features of the present invention.

In FIGS. 2, 3 a fruit hold-down arm is generally indicated at 56, the outer end of which is positioned directly over the center of the cup 20. This arm is supported for vertical swing on a horizontal pivot 57 (FIG. 2), and a spring 58 connects arm 56 with an extension 59 of one of the arms 49 that carries cam follower 48, hence this spring performs a double duty of yieldably holding the cam follower 48 against cam 53 (FIG. 8) and of yieldably urging arm 56 in a downward direction.

The arm 56 has a generally right angle extension 60 (FIG. 2) below pivot 57. Within the reentrant angle defined by arm 56 and extension 60 is a roller 61 that is carried on the upper end of a generally vertically extending latch arm 62. The latch arm 62 is pivotally connected to the outer end of extension 60 on arm 56 by a pivot that also carries a cam follower 63. A spring 64 yieldably holds the cam follower 61 against the arm 56 and extension 60 in the reentrant angle formed at their juncture.

Below cam follower 63 the latch arm 62 is formed with a downwardly projecting tooth 65 that is adapted to engage a shoulder 66 on a plate 67 that is rigid on the body of the orienting mechanism.

The peach receiving station, being at the lower left hand side of the machine as shown in FIG. 1, the arm 56 must be held in elevated position at said station to receive the fruit, and it is held elevated until released at the lower right hand side of the machine where it engages the oriented fruit.

FIG. 9 shows a cam track 69 that is rigid with the frame 1 and which is at the right hand side of the machine of FIG. 1. This track is adapted to be engaged by cam followers 61, 63 during the downward travel of each orienting mechanism shortly before reaching the clamps of the transfer device 25. Arm 56 is in the position shown in FIG. 2 and is locked there as previously described.

Cam followers 63, 61 engage the cam surface 72 of cam 69 as the cam followers travel downwardly. As said followers move downwardly on surface 72, arm 56 rotates counterclockwise about pivot 57 and against the urgency of spring 58 (FIG. 2) to a raised position somewhat higher than the normal position of FIG. 2. As this occurs, tooth 65 of latch arm 62 is withdrawn from engagement with shoulder 66, this movement also being in a counterclockwise direction. As follower 63 reaches the end of surface 72 (FIG. 9) it rides over the rise and onto another surface 74 which is inclined at a greater angle in the opposite direction of surface 72 and away from followers 61, 63.

The movement of the followers downwardly along surface 74, starting when follower 63 rides thereon, results in downward or clockwise movement of arm 56 about pivot 57. It will be noted in FIG. 9 that follower 63 is followed somewhat by follower 61 over the rise of surface 72 and onto surface 74. This results in a clockwise movement of follower 61 about the pivot on which both plate 62 and follower 63 are mounted, thereby forcing follower 61 out of its normal position in the reentrant angle formed between arm 56 and extension 60 and also raising locking tooth 65 of plate 62 sufficiently to clear shoulder 66 as arm 56 continues its downward movement to a position where it can clamp any fruit which may be contained in cup 20. It can be seen that the incline of surface 74 will result in a gradual lowering of arm 56 and therefore a gentle impact between said arm and the fruit. When arm 56 makes contact with the fruit the followers will be held against further clockwise movement and as the orienting mechanism 6 continues moving downwardly follower 63 will immediately break contact with inclined surface 74. Follower 61 will be held against surface 74 under the urgency of spring 64 (FIG. 2) for a short time allowing a relative counterclockwise rotation of said follower until the lower downwardly facing surface of tooth 65 makes contact with surface 68 of plate 67. When said contact is made, follower 61 will also leave surface 74 of cam track 69.

At this point, the fruit is securely clamped in cup 20 by the downward pressure of arm 56 under the urgency of spring 58. Before the clamps of the transfer device can engage the fruit to remove it from the orienting device, clamps 26, 27 must be spread and rotated apart. Thus, at approximately the same time arm 56 makes contact with the fruit, cam follower 51 (FIG. 7) will engage inclined surface 73 of cam track 54 and as previously described with respect to FIGS. 4 and 6 clamps 26, 27 will be spread and rotated to their widest position and held there by the action of locking arm 43.

At this time the clamps of the transfer device 25 will securely engage the fruit in its oriented position in order to transfer the fruit from the orienting mechanism 6 to possibly a slicing and pitting mechanism, and the fruit will be pulled from below the arm 56 thereby allowing spring 58 to further pull arm 56 downwardly until tooth 65 engages upstanding stop 70 that is rigid with the plate 67.

After each orienting device has passed the lower end of the machine and is travelling upwardly, the cam followers 61, 63 will engage the cam surface 80 (FIG. 10) of cam track 81 that is rigid with frame 1 of the machine, but at the side of the latter opposite to cam 69. This results in the arm 56, which is shown in dotted line position 82, being elevated to a fully and higher position of arm 56 at the peach receiving position than the position of the arm 56 in FIG. 2 and as the cam followers 61, 63 pass onto cam surface 83 from surface 80, the arm 56 gradually lowers until the tooth 65 again engages shoulder 66 on plate 67 and the arm will remain in this position until it is released to clamp a fruit body stationary in cup 20 at the transfer device 25.

Also, it should be noted that by the present method the peach is not transferred from one support to another while it is carried along a path, but is supported on its underside when it is carried upwardly, laterally and downwardly by the endless vertically extending conveyor means. This appreciably lengthens the period of time when the orienting wheel can operate on the peach without increasing the horizontal length of the machine. In most systems heretofore used, the peach is transferred from one support to another after it reaches the top of the upwardly extending path thus completely losing the benefit of any orientation that may have occurred as the peach supports move upwardly to the top of the path.

To summarize the steps performed by the machine illustrated and described, as soon as the peach is deposited in a cup, which very loosely supports it, the peach clamps immediately center the peach on the wheel, and almost as quickly release their clamping engagement with the peach so that the latter can shift about different axes, but the clamps still loosely hold the peach substantially centered over the wheel and this continues until the peach reaches the lower end of its downward path and almost reaches the transfer device. At this point, in order to preserve the orientation of the peach, the arm swings down to yieldably hold the peach stationary, and the clamps that had been loosely holding the peach centered over the orienting wheel move widely apart so the transfer device can move to grip the sides of the peach and the peach is carried away.

It is to be understood that the embodiment of the invention shown and described is for the purpose of illustration and description and that various other forms may be devised within the scope of my invention as defined in the appended claims.

I claim:

1. The method of orienting a peach and the like each having an indent at its stem end that comprises the steps of: moving a peach upwardly along a generally vertically extending path of travel and then laterally of said path at its upper end and then downwardly; supporting said peach continuously from below during its upward, lateral and downward movement in said path and substantially continuously moving said peach about different axes during its said upward and downward movement until the said indent faces directly downward and then discontinuing its said movement about said different axes, then clamping said peach between horizontally disposed surfaces and finally and substantially simultaneously releasing said peach from clamping relation and gripping opposite lateral sides of said peach and moving it laterally from said path.

2. The method of orienting a peach and the like having an indent at its stem end that comprises the steps of: supporting said peach on its underside for movement in one direction along a first straight path of travel and for return movement in an opposite direction along a second straight path of travel, aligning said peach on a straight line that is coincidental with said first path of travel by engaging said peach at opposite sides thereof at points equally spaced from said line at opposite sides of the latter; then slightly loosening said peach from said engagement sufficiently to permit said peach to be shifted about different axes extending through said line; so shifting said peach during said movement thereof along said first path and transferring said peach laterally to said second path while continuously supporting it from below and then shifting said peach about different axes during its movement in said second path until said indent faces directly downwardly, then positively clamping said peach against further shifting thereof while continuing its movement in said second path, and finally removing said peach from said path for further processing.

3. An orienter for peaches and the like comprising an endless vertically extending conveyor providing upwardly movable flights at one side of the conveyor and descending flights at the opposite side thereof movable slowly straight, vertically extending parallel lines when said conveyor is actuated for movement in one direction; each of said flights including an orienting mechanism and each mechanism having a support on which a peach is adapted to be freely supported for rocking of said peach thereon and for rotating such peach about different axes; means connected with said conveyor for so actuating it for said movement; positioning means carried by said orienting mechanism movable into and out of clamping engagement with opposite sides of said peach at the lower end of said upwardly movable flight for centering said peach on said support, means connected with said positioning means for so moving it into said clamping engagement with said opposite sides of said peach for moving said positioning means slightly away from said opposite sides after said clamping engagement whereby said peach will thereafter be free for shifting relative to said support for orienting it, said positioning means comprising a pair of spaced horizontally opposed clamps having generally V-shaped oppositely opening sides disposed with their said sides in a horizontal plane; means on said orienting mechanism supporting said clamps for movement along a straight horizontal line toward and away from each other; the means for so moving said clamps into said engagement comprising a spring whereby there will be a yieldable engagement between said clamps and said peach when the clamps engage said peach.

4. In an orienter for peaches and the like, an orienting mechanism that includes a body having a pair of horizontally spaced opposed clamps; means on said body mounting said clamps for movement toward each other into clamping relation with opposite sides of a peach; supporting means on said body for supporting a peach between said clamps, and yieldable means operatively connected with said clamps for moving them into yieldable engagement with opposite sides of said peach for centering said peach on said supporting means; means connected with said clamps for positively moving them apart a limited distance sufficient to support a peach substantially centered on said supporting means while permitting rotary movement of said peach on said supporting means, conveyor means connected with said orienting mechanism for moving it along an endless vertically extending path of travel whereby said mechanism will be moved upwardly and then downwardly, a stationary frame supporting said conveyor means for said movement and moving means connected with said conveyor means for so moving it, and means on said frame and said orienting mechanism engageable with each other during upward movement of said orienting mechanism for moving said clamps apart.

5. In an orienter for peaches and the like, an orienting mechanism that includes a body having a pair of horizontally spaced opposed clamps; means on said body supporting said clamps for simultaneous movement of said clamps toward each other at the same rate; and yieldable means operatively connected with said clamps for so moving them; means operatively connected with said clamps for moving them apart at the same rate of speed; a support on said mechanism for supporting a peach between said clamps, a rotatable device projecting upwardly of the center of the bottom of said support for engagement with the lower side of a peach in said support, rotating such peach while it is supported on said support and means connected with said rotatable device for rotating it, an arm extending over said support movable downwardly into engagement with a peach supported on said support for holding the peach stationary relative to said support, a stationary frame, endless conveyor means on said frame actuatable and movable for moving said orienting mechanism along a predetermined path of travel; means connected with said conveyor means for so moving it to carry said mechanism along said path, and means actuatable by said movement at a point where said arm is in said engagement with a peach for moving said clamps widely apart to enable peach transfer means to engage opposite sides of said peach; said last mentioned means including a cam stationary on said frame and a cam follower operatively connected with said clamps.

6. The method of orienting a peach or similar generally spherical fruit having an indent at its stem end that comprises the steps of:

continuously supporting said peach from below for continuous movement thereof along a path that includes a pair of generally upwardly extending portions disposed in a vertical plane in spaced side by side relation and which portions are joined at one of their ends by a generally laterally extending portion;

continuously moving said peach, while it is so supported from below, along one of said pair of portions toward and to said generally laterally extending portion, and then along said generally laterally extending portion toward and to the other portion of said pair thereof, and then along said other portion away from said generally laterally extending portion;

moving said peach about different axes extending therethrough while it is supported from below and during said movement along said path until said indent faces substantially directly downwardly, and thereafter removing said peach from said path.

References Cited by the Examiner
UNITED STATES PATENTS

| | | | |
|---|---|---|---|
| 1,680,035 | 8/28 | Buckingham | 198—138 X |
| 2,788,818 | 4/57 | Skog. | |
| 2,933,174 | 4/60 | Hait. | |
| 2,969,867 | 1/61 | McClelland. | |
| 3,118,530 | 1/64 | Harrer. | |

SAMUEL F. COLEMAN, *Acting Primary Examiner.*

EDWARD A. SROKA, ABRAHAM BERLIN, ERNEST A. FALLER, JR, *Examiners.*